(12) United States Patent
Baxter et al.

(10) Patent No.: US 11,628,451 B2
(45) Date of Patent: Apr. 18, 2023

(54) METHODS AND SYSTEMS FOR LIQUID SEPARATIONS

(71) Applicant: Sustainable Energy Solutions, Inc., Provo, UT (US)

(72) Inventors: Larry Baxter, Orem, UT (US); Stephanie Burt, Provo, UT (US)

(73) Assignee: Sustainable Energy Solutions, LLC, Provo, UT (US)

( * ) Notice: Subject to any disclaimer, the term of this patent is extended or adjusted under 35 U.S.C. 154(b) by 996 days.

(21) Appl. No.: 16/364,085

(22) Filed: Mar. 25, 2019

(65) Prior Publication Data

US 2020/0306768 A1    Oct. 1, 2020

(51) Int. Cl.
  *B04B 1/20*    (2006.01)
  *B01D 8/00*    (2006.01)
  *B01D 17/12*   (2006.01)

(52) U.S. Cl.
  CPC .............. *B04B 1/20* (2013.01); *B01D 8/00* (2013.01); *B01D 17/12* (2013.01); *B01D 2257/302* (2013.01); *B01D 2257/40* (2013.01); *B01D 2257/502* (2013.01); *B01D 2257/504* (2013.01); *B01D 2257/702* (2013.01); *B01D 2257/80* (2013.01)

(58) Field of Classification Search
  CPC .......... B01D 2257/502; B01D 2257/80; B01D 8/00; B01D 2257/504; B01D 17/12; B01D 2257/302; B01D 2257/40; B01D 2257/702; B30B 9/12; B30B 15/34; B04B 1/20; C10L 2290/547; C10L 2290/06; C10L 2290/50; C10L 3/104; F25J 2205/20; F25J 3/0635; F25J 3/061; F25J 3/067; F25J 1/00; F25J 1/0022; F25J 1/0235; F25J 3/062; F25J 2210/60; F25J 2220/66; Y02C 20/40
  See application file for complete search history.

(56) References Cited

U.S. PATENT DOCUMENTS

3,791,157 A * 2/1974 Tracy ................ F25J 1/0022
                                                      62/927
2008/0202159 A1* 8/2008 Fountain ............ F25J 1/0085
                                                      62/612

(Continued)

FOREIGN PATENT DOCUMENTS

WO   WO 2016 060 777 A2 *  4/2016  ........... F25J 1/0265
WO   WO 2016 060 777 A3 *  6/2016  ........... F25J 1/0022

*Primary Examiner* — Timothy C Vanoy
(74) *Attorney, Agent, or Firm* — Cook Alex Ltd.

(57) ABSTRACT

Methods and systems for separating liquid components are disclosed. A vessel is provided containing a solids conveyance device. At least a first portion of the vessel acts as an indirect-contact heat exchanger and a second portion of the vessel contains a filter. A process liquid stream, containing a first component and a second component, is passed into the first portion of the vessel. A portion of the second component is frozen and entrained in the first portion of the vessel into the process liquid stream, resulting in a process slurry stream. The process slurry stream is passed into a second portion of the vessel by the solids conveyance device. The process slurry stream is separated into a solid product stream and a primary liquid product stream by passing the primary liquid product stream through the filter and out of the vessel while separately removing the solid product stream out of the vessel.

20 Claims, 6 Drawing Sheets

(56) References Cited

U.S. PATENT DOCUMENTS

| | | | |
|---|---|---|---|
| 2012/0023947 A1* | 2/2012 | Kulkarni | F23J 15/06 60/693 |
| 2018/0252468 A1* | 9/2018 | Tang | F25J 1/0022 |
| 2020/0317591 A1* | 10/2020 | Trueba | F25J 1/0052 |

* cited by examiner

401
Provide a vessel containing a solids conveyance device, with a first portion acting as a first indirect-contact heat exchanger and a second portion containing a filter.

402
Pass a process liquid stream, containing first and second components, into the first portion of the vessel.

403
Freeze and entrain a portion of the second component into the process liquid stream, resulting in a process slurry stream.

404
Pass the process slurry stream into the second portion of the vessel by the solids conveyance device.

405
Separate the process slurry stream into a solid product stream and a primary liquid product stream by passing the primary liquid product stream through the filter and out of the vessel while separately removing the solids product stream out of the vessel.

METHODS AND SYSTEMS FOR LIQUID SEPARATIONS

GOVERNMENT INTEREST STATEMENT

This invention was made with government support under DE-FE0028697 awarded by the Department of Energy. The government has certain rights in the invention.

TECHNICAL FIELD

The methods and processes described herein relate generally to separation of components.

BACKGROUND

Liquid-liquid separations processes are often energy intensive or complex. Distillation, for example, requires heating the liquid mixture to the point one component becomes a vapor. Distillation towers are often extremely large and expensive, with high operational costs. Alternatives for liquid-liquid separations are needed.

SUMMARY

In a first aspect, the disclosure provides a method for separating liquid components. A vessel is provided containing a solids conveyance device. At least a first portion of the vessel acts as a first indirect-contact heat exchanger and a second portion of the vessel contains a filter. A process liquid stream, containing a first component and a second component, is passed into the first portion of the vessel. A portion of the second component is frozen and entrained in the first portion of the vessel into the process liquid stream, resulting in a process slurry stream. The process slurry stream is passed into a second portion of the vessel by the solids conveyance device. The process slurry stream is separated into a solid product stream and a primary liquid product stream by passing the primary liquid product stream through the filter and out of the vessel while separately removing the solid product stream out of the vessel.

In a second aspect, the disclosure provides a system for separating components. A vessel contains an inlet, an enclosed section, a filtering section with a permeable wall, a liquids outlet, a solids outlet, and an auger spanning the enclosed section and the filtering section. The inlet is configured to transport a process liquid stream into the enclosed section. The process liquid stream contains a first component and a second component. The enclosed section contains a first indirect-contact heat exchanger configured to cool the process liquid stream such that a portion of the second component freezes and entrains into the process liquid stream, resulting in a process slurry stream. The solids conveyance device is configured to transport the process slurry stream from the enclosed section through the filtering section. The filtering section is configured to receive the process slurry stream and separate the process slurry stream into a solid product stream and a primary liquid product stream by passing the primary liquid product stream out of the enclosed section through the permeable wall. The solids outlet is configured to pass the solid product stream out of the vessel.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "slurry" means any solids entrained in a liquid. This includes pastes.

Separations of liquid components is a challenge faced by most industries. Distillation, crystallization, and other techniques are often expensive, energy intensive, and complex. The present invention is able to separate liquid components in a simple, thermodynamically efficient manner. The methods and systems described will work for any combination of components where the first component is a compound or combination of compounds that remains a liquid while the second component freezes. The liquid mixture is passed into a screw or piston that has two sections. The first section cools the liquid until the second component freezes out as a solid and then conveys the solids and remaining liquid into the second section. The second section is a filtering section. The remaining liquid is forced out of the filtering section through a filter while the solids are passed through a restricted outlet that provides the backpressure that forces the liquid out through the filter. The methods and systems described herein are a process simplification over the prior art. With no vapor-phase transitions, the system can operate without any expensive and large vapor-phase equipment, such as compressors. A significant energy savings also occurs as no recompression is needed with no vapor phase.

Figure 1:
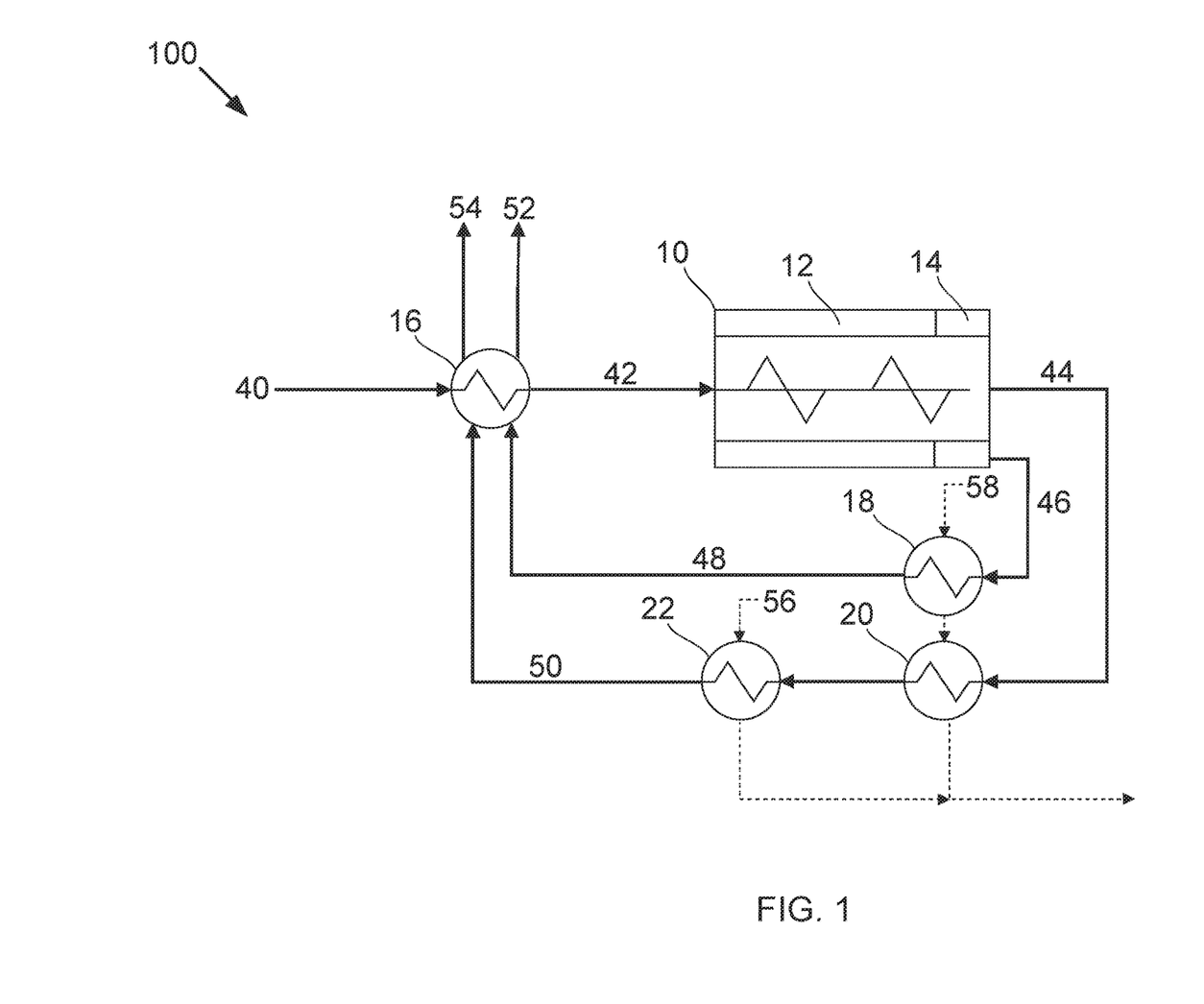
FIG. 1 is a process flow diagram showing a method for separating components as per one embodiment of the present invention.
Figure 3A:
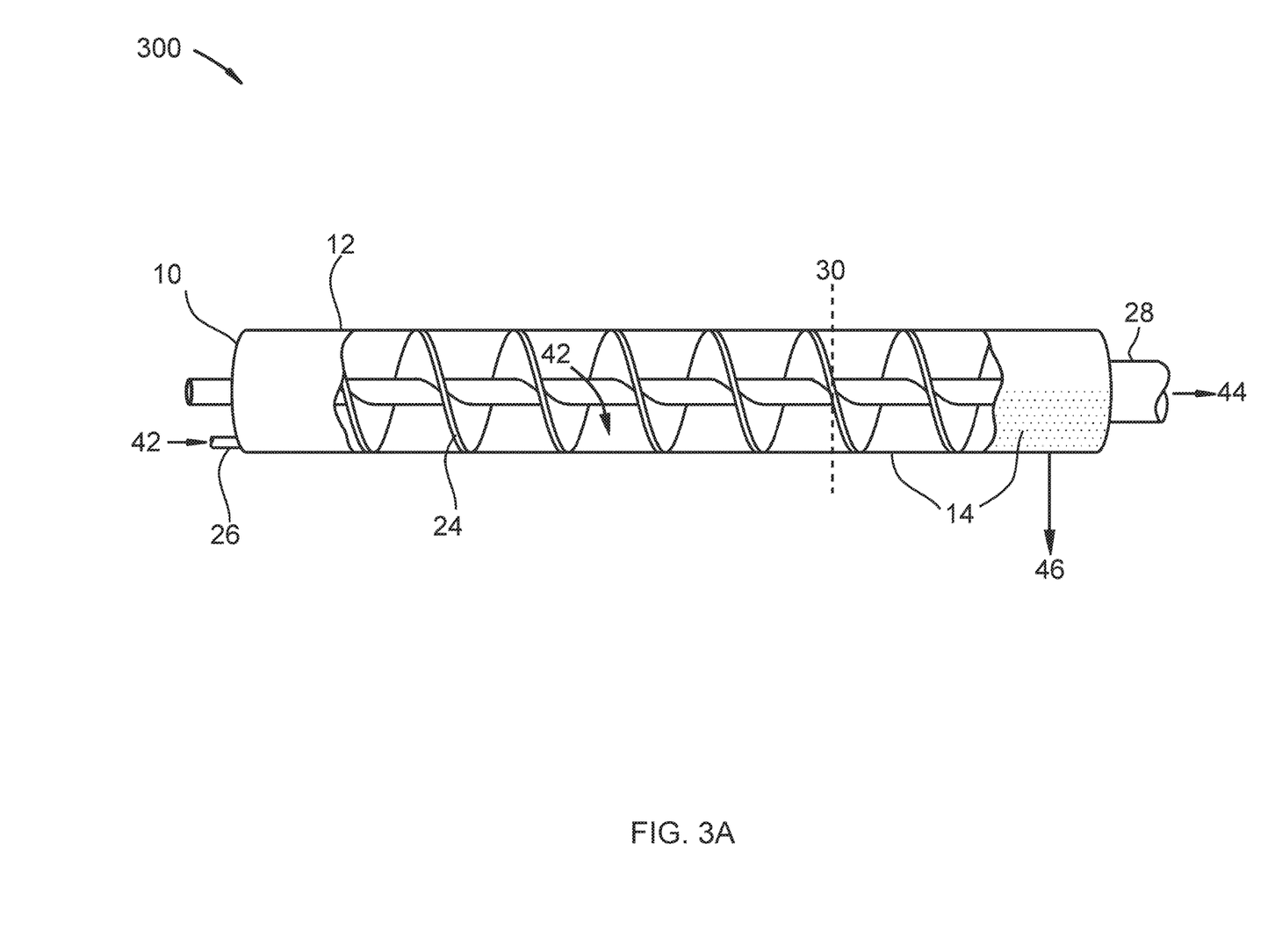
FIGS. 3A-B are cutaway side elevation views of a screw press filter for separating components as per one embodiment of the present invention.
Figure 3B:
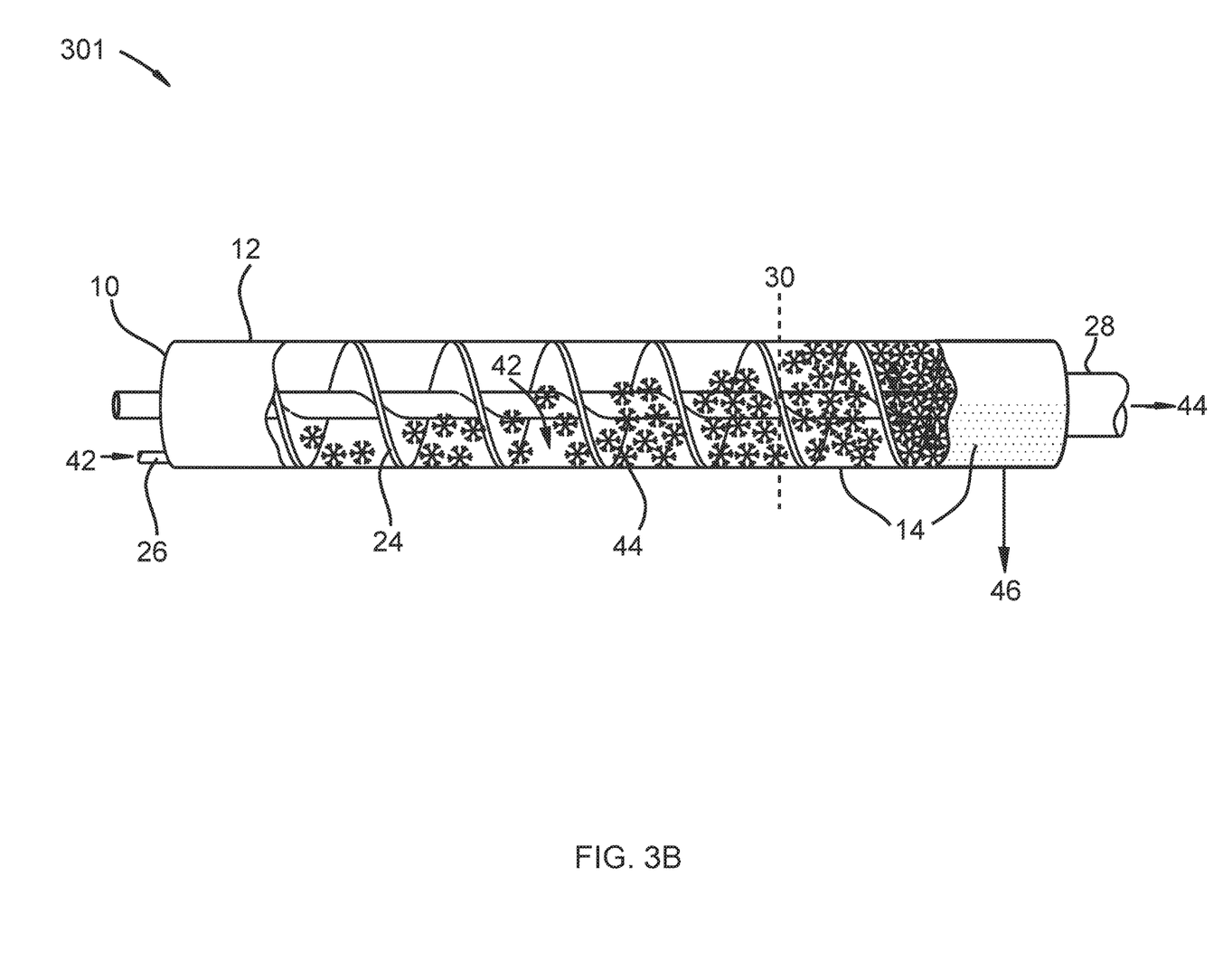

Now referring to FIG. 1, FIG. 1 is a process flow diagram 100 showing a method for separating components as per one embodiment of the present invention. In this preferred embodiment, a process fluid stream 40 is provided as a supercritical mixture of 30 wt % methane and 70 wt % carbon dioxide at about 60° C. and about 92 bar. The process fluid stream 40 passes through a first indirect-contact heat exchanger (ICHE) 16 where it is cooled isobarically to about −55° C. This is near the point that solid carbon dioxide forms under these conditions (−57° C.), but still above it. The resulting process liquid stream 42 has transitioned from a supercritical to a liquid. The process liquid stream 42 is passed into a combined heat exchanger and solids separator 10. The combined heat exchanger and solids separator 10 consists of a heat exchange section 12, a filtering section 14, and a solids conveyance device that passes material from the inlet through the outlet, through each section, in turn. The process liquid stream 42 is cooled inside the jacketed heat exchange section 12 to about −114° C. such that substantially all of the carbon dioxide freezes out as a solid product stream 44. The solid product stream 44 is compressed against a solids outlet of the filtering section 14, pressing the remaining liquid, primarily methane, out of the filtering section as a first liquid stream 46. An example of the combined heat exchanger and solids separator 10 is shown in FIGS. 3A and 3B, with more detailed descriptions of the solid/liquid separations. In a preferred embodiment, "substantially all" of the carbon dioxide freezing means between 1 mol % and 12 mol % of the carbon dioxide remains in the liquid phase. In a more preferred embodiment, between 1 mol % and 2 mol % remains in the liquid phase. In a most preferred embodiment, between 50 ppm and 1 mol % remains in the liquid phase. In some embodiments, the solids freeze against the screw or the walls of the jacketed heat exchange section and are then scraped into the liquid, resulting in the slurry. The entraining step can occur, therefore, by either directly freezing the solids into the liquid, or by freezing against the surfaces of the vessel.

The first liquid stream 46 is warmed against a refrigerant 58 across a second ICHE 18. The warmed first liquid stream 48, now at about −57° C., is then further warmed against the first ICHE 16, precooling the process fluid stream 40, leaving as a methane-rich product stream 52.

The solid product stream 44 is warmed and melted against cooled refrigerant 58 and refrigerant 56 in a third and fourth ICHE 20 and 22, respectively, resulting in a second liquid stream 50 at about −57° C. This is then further warmed against the first ICHE 16, precooling the process fluid stream 40, leaving as carbon dioxide product stream 54.

One benefit of the method and systems described herein is that the process may be operated isobarically, eliminating the often costly compressors and turbines needed in systems requiring pressure changes.

Figure 2:
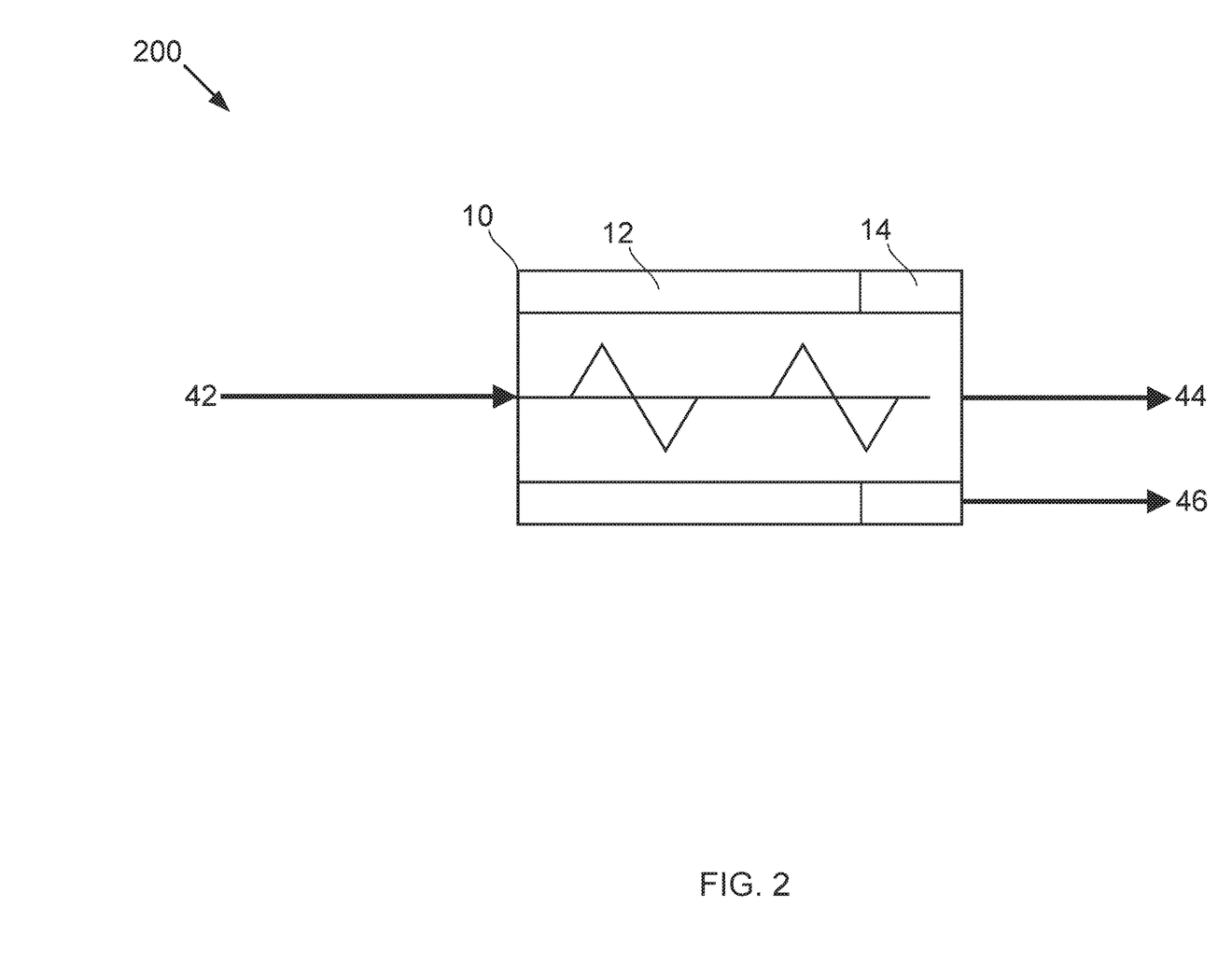
FIG. 2 is a process flow diagram showing a method for separating components as per one embodiment of the present invention.

Now referring to FIG. 2, FIG. 2 is a process flow diagram 200 showing a method for separating components as per one embodiment of the present invention. A process liquid stream 42, containing a first component and a second component, is passed into a combined heat exchanger and solids separator 10. The combined heat exchanger and solids separator 10 consists of a heat exchange section 12, a filtering section 14, and a solids conveyance device that passes material from the inlet through the outlet, through each section, in turn. The process liquid stream 42 is cooled inside the jacketed heat exchange section 12 such that substantially all of the second component freezes out as a solid product stream 44. The solid product stream 44 is compressed against a solids outlet of the filtering section 14, pressing the remaining liquid, primarily methane, out of the filtering section as a first liquid stream 46. In one embodiment, the heat exchange section 12 is cooled by an outside jacket. In another embodiment, the heat exchange section 12 is cooled by cooling the solids conveyance device. In a preferred embodiment, "substantially all" of the second component freezes out means at least 50% of the second component freezes out. In a more preferred embodiment, this means that at least 90% of the second component freezes out. In a most preferred embodiment, this means that at least 99% of the second component freezes out.

In some embodiments, the solids conveyance device is a screw. In other embodiments, the solids conveyance device is a piston.

Now referring to FIG. 3, FIGS. 3A-B are cutaway side elevation views 300 and 301 of a screw press filter for separating components as per one embodiment of the present invention. FIG. 3B shows the solids formation occur but is otherwise identical to FIG. 3A. The screw press filter 10 contains a heat exchange section 12 and a filter section 14, split by dashed line 30. The screw press filter 10 also has a fluid inlet 26, a restricted solids outlet 28, and a screw 24. A process liquid stream 42, containing a first component and a second component, is passed through the fluid inlet 26 into the heat exchange section 12. The process liquid stream 42 is cooled in the heat exchange section 12 such that substantially all of the second component freezes and becomes entrained as a solid product stream 44 in the resultant slurry. The solids product stream 44 is conveyed to the end of the screw and pressed against and through the restricted solids outlet. This restriction sets up a back pressure that forces the first component out of the filter section 14 as a product liquid stream 46. In other embodiments, the screw press filter is replaced with a tubular heat exchanger with a piston or plunger to clean the inside of the tube. In other embodiments, the screw press filter is replaced with a plate heat exchanger with a piston or plunger to clean the inside of the tube.

Figure 4:
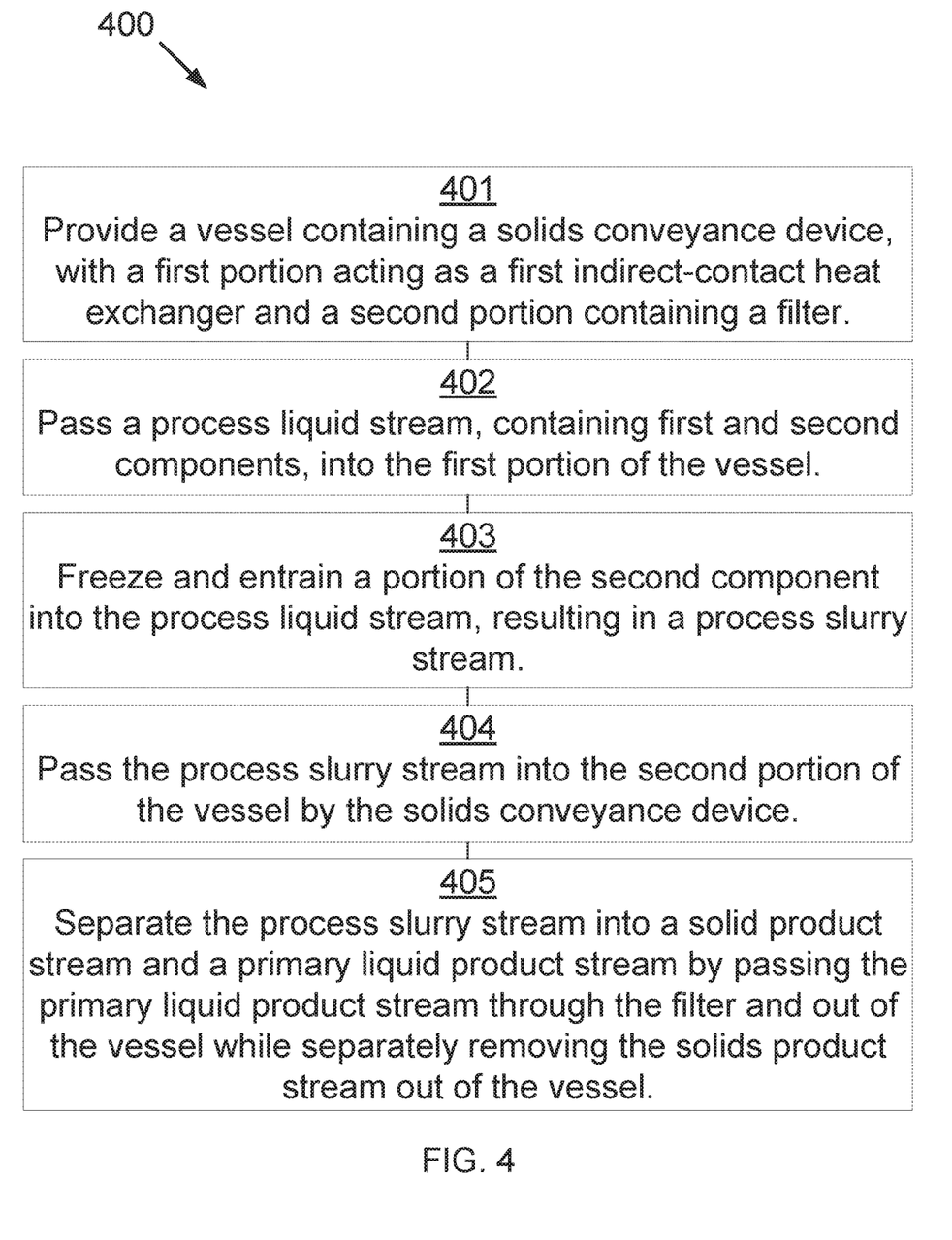
FIG. 4 is a block diagram showing a method for separating components as per one embodiment of the present invention.

Now referring to FIG. 4, FIG. 4 is a block diagram 400 showing a method for separating components as per one embodiment of the present invention. At 401, a vessel containing a solids conveyance device is provided. The first portion of the vessel acts as a first indirect-contact heat exchanger and a second portion of the vessel contains a filter. At 402, a process liquid stream, containing first and second components, is passed into the first portion of the vessel. At 403, a portion of the second component is frozen and entrained into the process liquid stream, resulting in a process slurry stream. At 404, the process slurry stream is passed into a second portion of the vessel by the solids conveyance device. At 405, the process slurry stream is separated into a solid product stream and a primary liquid product stream by passing the primary liquid product stream through the filter and out of the vessel while separately removing the solids product stream out of the vessel.

Figure 5:
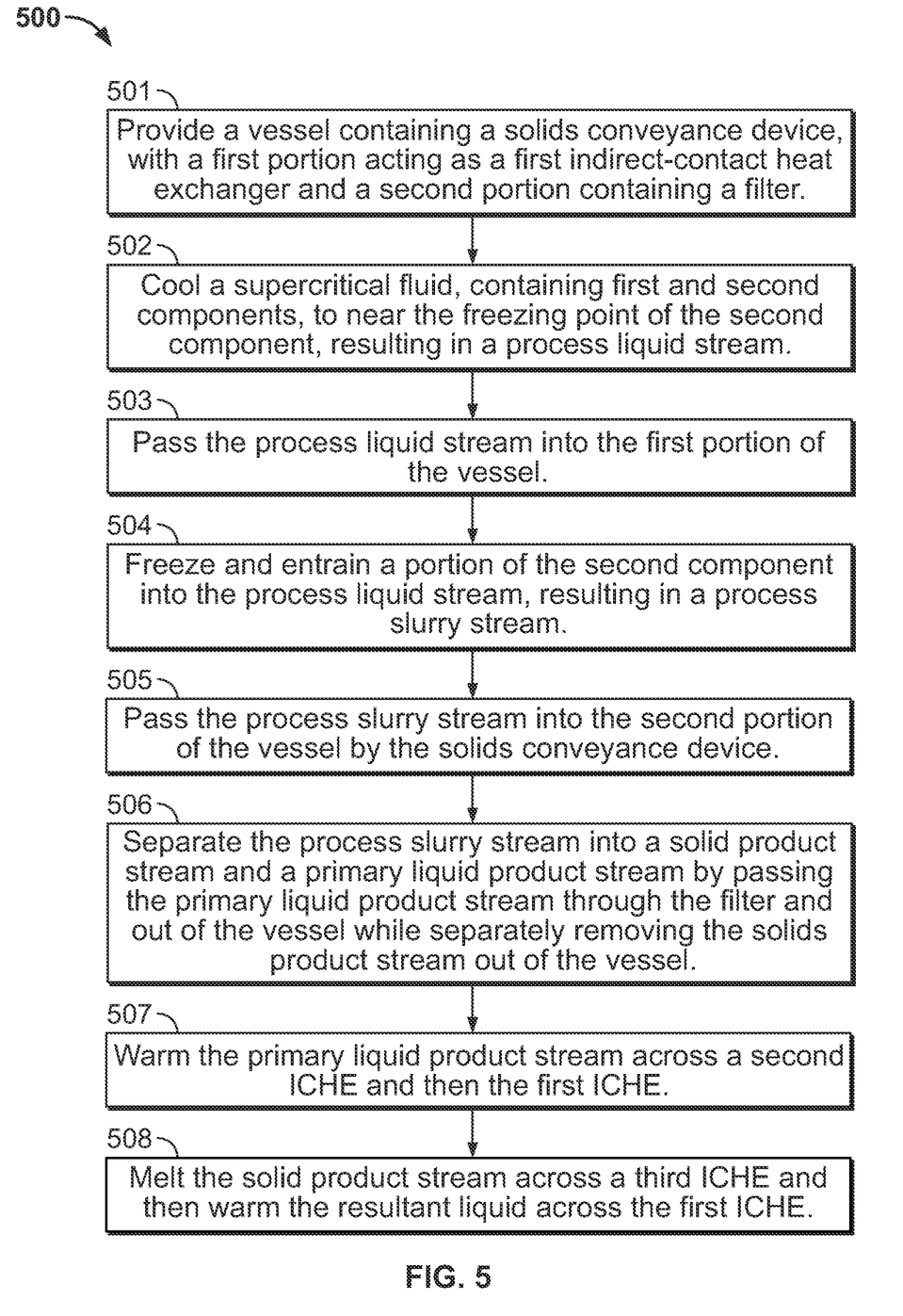
FIG. 5 is a block diagram showing a method for separating components as per one embodiment of the present invention.

Now referring to FIG. 5, FIG. 5 is a block diagram 500 showing a method for separating components as per one embodiment of the present invention. At 501, a vessel containing a solids conveyance device is provided. The first portion of the vessel acts as a first ICHE and a second portion of the vessel contains a filter. At 502, a supercritical fluid, containing first and second components, is cooled to near the freezing point of the second component, resulting in a process liquid stream. At 503, the process liquid stream is passed into the first portion of the vessel. At 504, a portion of the second component is frozen and entrained into the process liquid stream, resulting in a process slurry stream. At 505, the process slurry stream is passed into a second portion of the vessel by the solids conveyance device. At 506, the process slurry stream is separated into a solid product stream and a primary liquid product stream by passing the primary liquid product stream through the filter and out of the vessel while separately removing the solids product stream out of the vessel. At 507, the primary liquid product stream is warmed across a second ICHE and then the first ICHE. At 508, the solid product stream is melted across a third ICHE and then the resultant liquid is warmed across the first ICHE.

In some embodiments, the first component consists of a hydrocarbon selected from the group consisting of methane, ethane, propane, isobutane, n-butane, and combinations thereof. In some embodiments, the first component also includes N2, He, H2S, hydrocarbons with 5 or more carbons, H2O, CO2, or combinations thereof. In some embodiments, the second component consists of an acid gas selected from the group consisting of carbon dioxide, sulfur oxides, nitrogen oxides, carbon monoxide, and combinations thereof. In some embodiments, the second component includes water.

In some embodiments, the first ICHE is a wall around the first portion of the vessel. In some embodiments, this means cooling pipes are wrapped around the first portion. In some embodiments, the solids conveyance device is an auger and the portion of the auger in the first portion of the vessel is internally cooled. In other words, the solids conveyance device itself is the first ICHE in these embodiments.

In some embodiments, the solids conveyance device is an auger that is wider in the second portion of the vessel than in the first portion. This restricts the volume in the second portion, forcing the solids to be compressed and the process liquid to be squeezed out through the filter. In some embodiments, the solids outlet is restricted such that the solids outlet causes a backpressure on the slurry stream, driving the process liquid out of the solids and through the filter.

The invention has been described with reference to various specific and preferred embodiments and techniques. Nevertheless, it is understood that many variations and modifications may be made while remaining within the spirit and scope of the invention.

What is claimed is:

1. A method for separating liquid components comprising:
   providing a vessel comprising a solids conveyance device, wherein at least a first portion of the vessel acts as a first indirect-contact heat exchanger and a second portion of the vessel comprises a filter;
   passing a process liquid stream, comprising a first component and a second component, into the first portion of the vessel;
   freezing and entraining a portion of the second component in the first portion of the vessel into the process liquid stream, resulting in a process slurry stream;
   passing the process slurry stream into the second portion of the vessel by the solids conveyance device; and
   separating the process slurry stream in the second portion of the vessel into a solid product stream and a primary liquid product stream by passing the primary liquid product stream through the filter and out of the vessel while separately removing the solid product stream out of the vessel.

2. The invention of claim 1, wherein the first component comprises a hydrocarbon selected from the group consisting of methane, ethane, propane, isobutane, n-butane, and combinations thereof.

3. The invention of claim 2, wherein the second component comprises a compound selected from the group consisting of carbon dioxide, sulfur oxides, nitrogen oxides, carbon monoxide, water, and combinations thereof.

4. The invention of claim 1, wherein the process liquid stream is produced by cooling a supercritical process fluid stream across a second indirect-contact heat exchanger.

5. The invention of claim 4, further comprising warming the primary product liquid stream across the second indirect-contact heat exchanger against the supercritical process fluid stream.

6. The invention of claim 4, further comprising melting the solid product stream across a second indirect-contact heat exchanger to form a secondary product liquid stream and warming the secondary product liquid stream across the first indirect-contact heat exchanger against the supercritical process fluid stream.

7. The invention of claim 4, further comprising:
   melting the solid product stream across a second indirect-contact heat exchanger against a first refrigerant to form a secondary product liquid stream;
   warming the secondary product liquid stream across the first indirect-contact heat exchanger against the supercritical process fluid stream;
   warming the primary liquid product stream across a third indirect-contact heat exchanger against a second refrigerant; and
   warming the primary liquid product stream across the first indirect-contact heat exchanger against the supercritical process fluid stream.

8. The invention of claim 1, wherein the first indirect-contact heat exchanger is a wall around the first portion of the vessel.

9. The invention of claim 1, wherein the first indirect-contact heat exchanger is a first portion of the auger.

10. The invention of claim 1, wherein a second portion of the auger in the second portion of the vessel is wider than a first portion of the auger in the first portion of the vessel such that a second volume between a wall of the vessel and the second portion of the auger is smaller than a first volume between a wall of the vessel and the first portion of the auger.

11. The invention of claim 1, wherein removing the solid product stream out of the vessel comprises a solids outlet that restricts the solid product stream, causing a backpressure that drives the primary liquid product stream out of the vessel through the filter.

12. A system for separating liquid components comprising:
- a vessel comprising an inlet, an enclosed section, a filtering section comprising a permeable wall, a liquids outlet, a solids outlet, and an auger spanning the enclosed section and the filtering section;
- the inlet configured to transport a process liquid stream into the enclosed section, wherein the process liquid stream comprises a first component and a second component,
- the enclosed section comprising a first indirect-contact heat exchanger configured to cool the process liquid stream such that a portion of the second component freezes and entrains into the process liquid stream, resulting in a process slurry stream;
- the solids conveyance device configured to transport the process slurry stream from the enclosed section through the filtering section;
- the filtering section configured to receive the process slurry stream and separate the process slurry stream into a solid product stream and a primary liquid product stream by passing the primary liquid product stream out of the enclosed section through the permeable wall; and
- the solids outlet configured to pass the solid product stream out of the vessel.

13. The invention of claim 12, wherein the first component comprises a hydrocarbon selected from the group consisting of methane, ethane, propane, isobutane, n-butane, and combinations thereof.

14. The invention of claim 12, wherein the second component comprises an acid gas selected from the group consisting of carbon dioxide, sulfur oxides, nitrogen oxides, carbon monoxide, and combinations thereof.

15. The invention of claim 12, further comprising a second indirect-contact heat exchanger configured to receive and cool a supercritical process fluid stream to form the process liquid stream.

16. The invention of claim 15, wherein the second indirect-contact heat exchanger is further configured to receive and warm the primary product liquid stream against the supercritical process fluid stream.

17. The invention of claim 15, further comprising a third indirect-contact heat exchanger configured to melt the solid product stream to form a secondary product liquid stream and wherein the second indirect-contact heat exchanger is further configured to receive and warm the secondary product liquid stream against the supercritical process fluid stream.

18. A method for separating liquid components comprising:
- providing a solids conveyance device that spans a vessel, the vessel comprising an enclosed section and a filtering section, wherein:
  - the enclosed section feeds the filtering section and comprises an indirect-contact heat exchanger and an inlet; and
  - the filter section is fed by the enclosed section, has a permeable exterior wall, and a solids outlet;
- passing a process liquid stream, comprising a first component and a second component, into the first portion of the vessel;
- freezing and entraining a portion of the second component in the enclosed section into the process liquid stream, resulting in a process slurry stream;
- advancing the process slurry stream by the solids conveyance device into the filter section;
- separating the process slurry stream into a solid product stream and a primary liquid product stream by passing the primary liquid product stream through the permeable exterior wall and out of the vessel while separately removing the solid product stream out the solids outlet.

19. The invention of claim 18, wherein the first component comprises a hydrocarbon selected from the group consisting of methane, ethane, propane, isobutane, n-butane, and combinations thereof.

20. The invention of claim 19, wherein the second component comprises a compound selected from the group consisting of carbon dioxide, sulfur oxides, nitrogen oxides, carbon monoxide, water, and combinations thereof.

* * * * *